July 13, 1965   W. MESSERSCHMITT   3,194,516
ARRANGEMENT FOR JET ENGINES AT THE TAIL END OF AIRCRAFT
Filed Oct. 22, 1962   2 Sheets-Sheet 1

INVENTOR.
Willy Messerschmitt
BY
Michael S. Striker

July 13, 1965 W. MESSERSCHMITT 3,194,516
ARRANGEMENT FOR JET ENGINES AT THE TAIL END OF AIRCRAFT
Filed Oct. 22, 1962 2 Sheets-Sheet 2
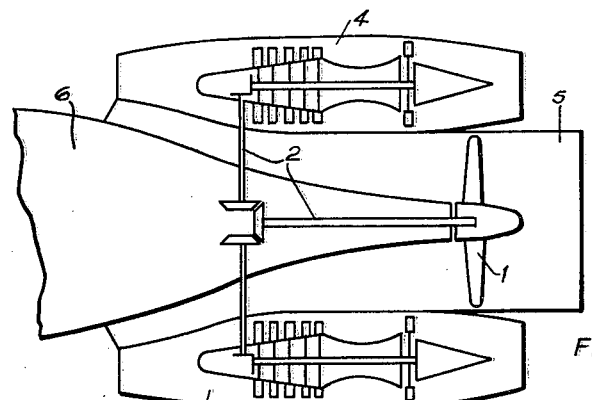
Fig. 4
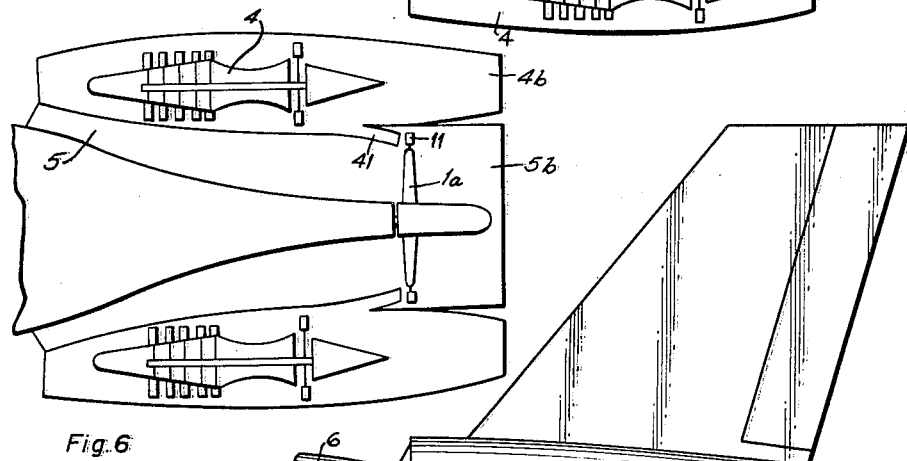
Fig. 6
Fig. 5
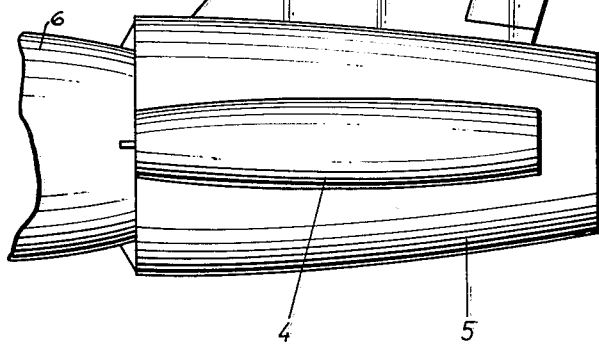
INVENTOR.
Willy Messerschmitt
BY
Michael S. Striker
Atty 3,194,516
ARRANGEMENT FOR JET ENGINES AT THE
TAIL END OF AIRCRAFT
Willy Messerschmitt, Munich, Germany, assignor to Messerschmitt A.G., Augsburg, Germany, a company of Germany
Filed Oct. 22, 1962, Ser. No. 232,026
14 Claims. (Cl. 244—74)

The invention relates to an aircraft having an arrangement for turbo-jet engines at the tail end thereof, in which the engines or engine assemblies are faired to conform to the body outline of the aircraft, the engine intakes being located in the rear peripheral surface of the aircraft body.

The trend of development in aircraft construction, especially of passenger-carrying aircraft and airliners, is increasingly in the direction of locating the turbo-jet engines on the sides at the tail end of the aircraft body. This arrangement has inter alia the advantage of permitting the aircraft to have a clean aerodynamically unobstructed wing, of reducing the noise in the passenger cabin and of facilitating the stabilisation of the aircraft in the event of engine failure on one side.

For powering aircraft of the above-mentioned types turbo-prop engines, for example by-pass turbo-jet engines, are used for the higher subsonic speeds. In the high subsonic range the latter have the advantage of being more economical than straight turbo-jet power units.

In smaller aircraft such an arrangement is more difficult to provide because of the greater diameter of the by-pass engine.

In the case of power units which are partly faired into the contour of the aircraft body a narrow channel is arranged to extend to the tail between the engine and the skin of the body. The object of this arrangement is to draw off the air from the boundary layer before it can enter the engine intake.

The present invention is an improvement of this arrangement, which consists in that a fan is located in a duct between the engines for accelerating the withdrawal of the boundary layer, the fan being coaxial with the aircraft body, or parallel, or at an angle thereto and driven either mechanically or by the exhaust gases from the engines.

The invention will now be described with reference to the accompanying drawings in which.

Figure 3:
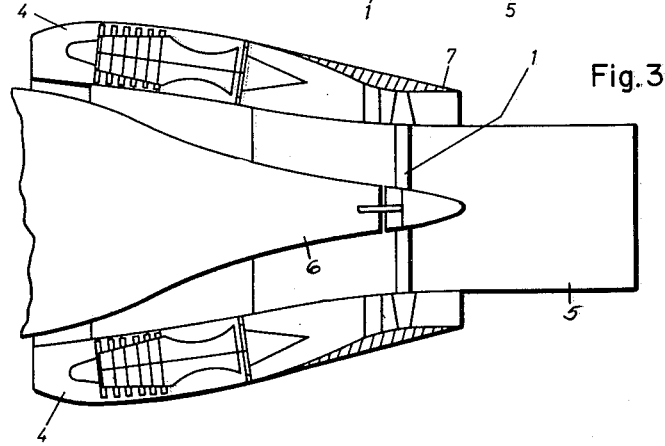

FIG. 3 in a plan view, partially in section, which illustrates a modification having a shortened annular jet pipe;

FIG. 4 in an enlarged plan view which illustrates a mechanical drive for the ducted fan;

FIG. 5 in a side view which illustrates the air duct arranged to carry the jet power units;

FIG. 6 is a schematic horizontal sectional view of another embodiment, and

Figure 7:
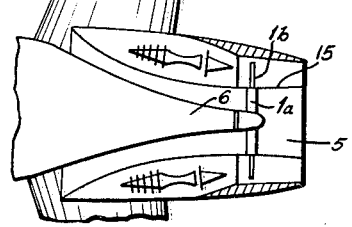

FIG. 7 is a schematic horizontal sectional view of a further embodiment.

Figure 1:
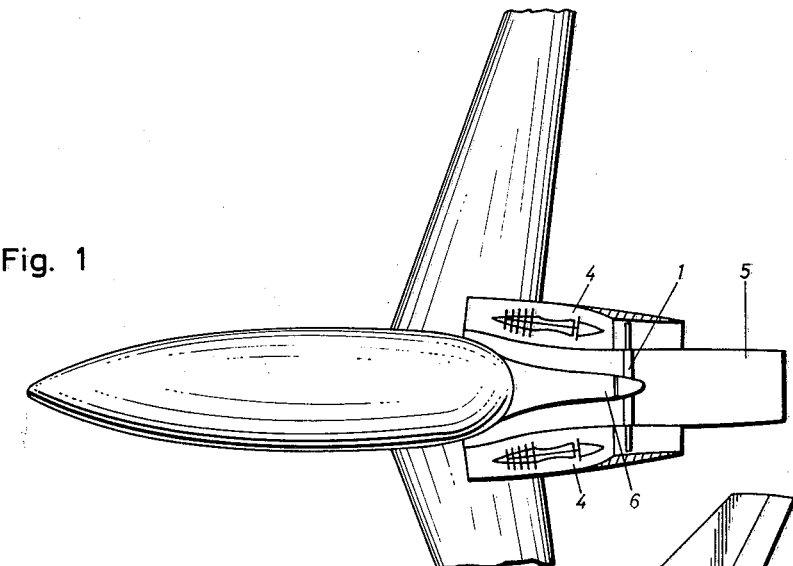
FIG. 1 is a schematic plan view, partially in section, of one arrangement of the engines including a fan for withdrawing the boundary layer through a duct.
Figure 2:
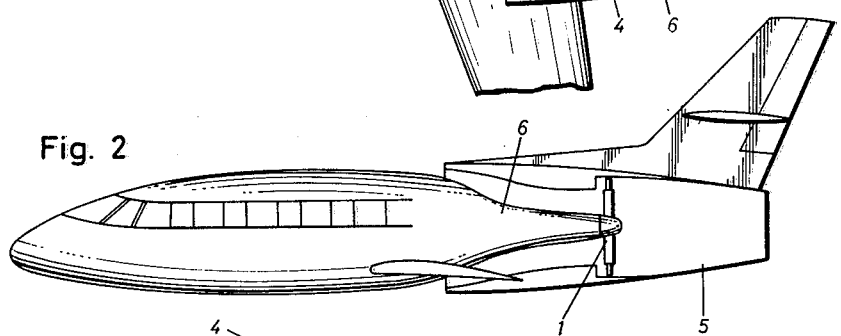
FIG. 2 is a side view thereof partially in section.

As shown in FIGS. 1, 2, and 3, two or more straight turbo-jet power units 4 are attached to the sides or circularly around the tail portion 6 of the aircraft within lateral casings 4a terminating in the rear in jet outlet pipes 4b, and are faired to conform as far as possible with the contours of the fuselage 10. In the region of the power units a central body tapers substantially to a terminal point. A nozzle-shaped duct means 15 forms a duct 5 with, and rearwardly of tail portion 4b extends to the end of the tail alongside the jet outlet pipes 4b or farther to the rear as shown in FIGS. 7 and 1, respectively. The forward duct portion 5a is annular, and the rear portion 5b contains a ducted fan 1 driven by the jet engines by transmission means 2, as shown in FIG. 4 or by the jet from the engines 4 as shown in FIGS. 1 to 3.

In the latter case the tips of the fan blades 1a of the fan 1 carry turbine blades 1b which pass through slots 15a in duct means 15 and are located in jet outlet pipes 4b so that fan blades 1a are driven by turbine blades 1b to draw air through duct 5. In a modified embodiment, the turbine blades 1b are exposed to branch jets tapped through nozzles 41 from one or more of the jet engines blades 1a of fan 1 may themselves be shaped to permit 4 for transferring their energy to the fan blades 1a of the fan as shown in FIG. 6. The blades 1a of fan 1 may themselves be shaped to permit the gas jet from the engines to drive them without the provision of special turbine blades. Alternatively the arrangement may be such that the fan follows a turbine which is driven by hot gases from the jet engines.

The entire plant thus resembles a by-pass power unit. For reasons connected with the location of the centre of gravity, this power plant and the fan may be situated a considerable distance forward of the tail end of the body, the exhaust gases and the air of the by-pass being ejected through a channel aft of the power plant.

As best seen in FIG. 5, duct means 15 may be constructed so that it can be used also to carry the tail power units 4 the fan 1 revolves in a preferably nozzle shaped duct 5 and the air reaches the fan through annular inlet slots 5c or through slots 5d in the body which are divided by connectors 15b into symmetrical sections. Conveniently these slots may be located close to the intakes 4c of the turbo-prop engines where in conjunction with the ducted fan 1 they serve for drawing the air away from the boundary layer. Preferably the ducted fan 7 is rotated through reversing gear 2a in a direction opposite to that of the shafts of the turbo-jet engines.

In an alternative form of construction the air which passes through the ducted fan, and which constitutes the by-pass, may be ejected to the rear through a special pipe.

For ejecting the gas jet from the engines, an annular jet pipe 4b which is as short as possible is arranged to enclose the turbine blades 1b and extend from them to the rear. This arrangement permits back pressure on the turbine blades to be kept within minimum limits and enables the power of the turbo-jet power plant to be more efficiently utilised by the gas turbine. FIG. 3 shows guide vanes 40 in modified jet paper 7.

The ducted fan may be capable of being tilted independently of the turbo-jet engines for the generation of a vertical component of thrust.

Conveniently the power plant may be attached to the body of the aircraft as an integral unit by a plurality of stays or other detachable connection elements. Moreover, the power plant may comprise only one engine without thereby abandoning the principle which underlies the invention.

I claim:

1. In an aircraft, in combination, a fuselage including a tapered tail portion; duct means mounted on said tail portion and forming with the same a duct, the forward end of said duct means forming with said tail portion a narrow inlet into said duct; rotary fan means located in said duct at the rear end of said tail portion; jet engine means supported on the aircraft outside of said duct and having air inlet means apart from said narrow inlet into said duct, said jet engine means being operatively connected with said fan means for rotating the same whereby said fan means draws air through said inlet and duct to remove the boundary layer from said fuselage.

2. In an aircraft, in combination, a fuselage including a tapered tail portion; duct means surrounding said tail portion and forming with the same a duct, the forward end of said duct means forming with said tail portion a narrow inlet into said duct; a rotary fan means located in said duct at the rear end of said tail portion mounted on said tail portion and having fan blades having tips located closely adjacent the inner surface of said duct means; and jet engine means supported on the aircraft disposed outwardly of said duct means and having air inlet means apart from said narrow inlet into said duct, said jet engine means being operatively connected with said fan means for rotating the same whereby said fan means draws air through said inlet and duct to remove the boundary layer from said fuselage.

3. An aircraft as set forth in claim 2 wherein the axis of rotation of said fan means is located in the vertical plane of symmetry of said tail portion.

4. An aircraft as set forth in claim 3 wherein said axis of rotation substantially coincides with the axis of said tail portion.

5. An aircraft as set forth in claim 1 wherein said inlet and the forward portion of said duct are annular, the forward edge of said duct means being annular and uniformly spaced from the outer surface of the forward end of said tail portion.

6. In an aircraft, in combination, a fuselage including a tapered tail portion; duct means surrounding said tail portion and forming with the same a duct, the forward end of said duct means forming with said tail portion a narrow inlet into said duct; rotary fan means located in said duct at the rear end of said tail portion; and jet engine means supported on the aircraft disposed outwardly of said duct means and being operatively connected with said fan means for rotating the same whereby said fan means draws air through said inlet and duct to remove boundary layer from said fuselage.

7. In an aircraft, in combination, a fuselage including a tapered tail portion; duct means surrounding said tail portion and forming with the same a duct, the forward end of said duct means forming with said tail portion a narrow inlet into said duct; rotary fan means located in said duct at the rear end of said tail portion; jet engine means supported on the aircraft, said jet engine means including rotary shaft means; and transmission means connecting said rotary shaft means with said fan means for rotating the same whereby said fan means draws air through said inlet and duct to remove the boundary layer from said fuselage.

8. An aircraft as set forth in claim 7 wherein said transmission means include gear means for rotating said fan means in a direction of rotation opposite to the direction of rotation of said shaft means of said jet engine means.

9. In an aircraft, in combination, a fuselage including a tapered tail portion; duct means surrounding said tail portion and forming with the same a duct, the forward end of said duct means forming with said tail portion a narrow inlet into said duct; rotary fan means located in said duct at the rear end of said tail portion; and jet engine means supported on the aircraft outwardly of said duct means and having air inlet means apart from said narrow inlet into said duct and constructed to direct jets of combustion gases onto said fan means for rotating the same whereby said fan means draws air through said inlet and duct to remove the boundary layer from said fuselage.

10. In an aircraft, in combination, a fuselage including a tapered tail portion; duct means surrounding said tail portion and forming with the same a duct, the forward end of said duct means forming with said tail portion a narrow inlet into said duct; rotary fan means including fan blades located in said duct at the rear end of said tail portion and turbine blades mounted on the outer tips of said fan blades outwardly of said duct means; jet engine means supported on the aircraft disposed outwardly of said duct means; and jet pipe means for guiding the jet of said jet engine means onto said turbine blades for rotating said fan blades whereby the same draw air through said inlet and duct to remove the boundary layer from said fuselage.

11. An aircraft as set forth in claim 10 wherein said jet pipe means include two jet pipes located outwardly of said duct means, said jet engine means including two jet engines located on opposite sides of said duct means outwardly of the same.

12. An aircraft as set forth in claim 11 wherein said duct means extend rearwardly at least to the rear end of said jet pipe means and said outlet.

13. In an aircraft, in combination, a fuselage including a tapered tail portion; duct means mounted on said tail portion and having a forward end forming with said tail portion a first narrow inlet means adapted to be located in the region of the boundary layer of air on said tail portion; fan means located in said duct means at the rear end of said tail portion; jet engine means supported on the aircraft and including second duct means having a second inlet means located outwardly of said first inlet means and adapted to receive air located outwardly of the boundary layer, said jet engine means being operatively connected with said fan means for operating the same whereby said fan means draws air through said first inlet means into said duct means to remove the boundary layer of air from said fuselage while no air of the boundary layer enters said second inlet means and is supplied to said jet engine means.

14. In an aircraft, in combination, a fuselage including a tail portion; duct means mounted on said tail portion and having a forward end forming with said tail portion a narrow inlet adapted to be located in the region of the boundary layer of air on said tail portion; exhaust means located in said duct means at the rear end of said tail portion; and jet engine means supported on the aircraft outside of said duct means and having inlet means located outwardly of said narrow inlet and adapted to receive air from a region located outwardly of said boundary layer, said jet engine means being operatively connected with said exhaust means for operating the same whereby the same draws air through said inlet into said duct means to remove the boundary layer from said fuselage while air is supplied to said jet engine means from a region located outwardly of said boundary layer.

References Cited by the Examiner

UNITED STATES PATENTS

| 2,397,999 | 4/46 | Goddard | 244—74 X |
| 2,571,586 | 10/51 | Lane | 244—73 X |
| 3,075,728 | 1/63 | Kogan | 244—74 |
| 3,119,577 | 1/64 | Andrews | 244—7 |

FOREIGN PATENTS 930,993 9/47 France.

FERGUS S. MIDDLETON, *Primary Examiner.*

ANDREW H. FARRELL, *Examiner.*